US009552282B2

United States Patent
Needamangala et al.

(10) Patent No.: US 9,552,282 B2
(45) Date of Patent: *Jan. 24, 2017

(54) MODULE INTERROGATION (75) Inventors: Ashwin S. Needamangala, Redmond, WA (US); Mariyan D. Fransazov, Redmond, WA (US); John R. Ashmun, Redmond, WA (US); Kantcho I. Bogdev, Sammamish, WA (US); Ying Deng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

This patent is subject to a terminal disclaimer.

(21) Appl. No.: 13/314,009

(22) Filed: Dec. 7, 2011

(65) Prior Publication Data
US 2012/0079508 A1 Mar. 29, 2012

Related U.S. Application Data (63) Continuation of application No. 12/051,823, filed on Mar. 19, 2008, now Pat. No. 8,117,625.

(51) Int. Cl.
*G06F 3/00* (2006.01)
*G06F 11/36* (2006.01)
*G06F 9/54* (2006.01)
*G06F 13/10* (2006.01)

(52) U.S. Cl.
CPC ............ *G06F 11/3672* (2013.01); *G06F 9/54* (2013.01); *G06F 13/102* (2013.01)

(58) Field of Classification Search
CPC ........... G06F 9/54; G06F 9/547; G06F 13/102
USPC ................................................. 719/328, 321
See application file for complete search history.

(56) References Cited

U.S. PATENT DOCUMENTS

| 5,257,097 | A | | 10/1993 | Pineau et al. |
| 5,491,808 | A | * | 2/1996 | Geist, Jr. ........................ 711/100 |
| 5,673,315 | A | * | 9/1997 | Wolf ................................. 705/59 |
| 5,822,510 | A | | 10/1998 | LeClair |
| 5,943,503 | A | | 8/1999 | Kai |
| 6,144,458 | A | * | 11/2000 | McLachlan et al. ......... 358/1.15 |
| 6,490,696 | B1 | | 12/2002 | Wood |
| 6,871,350 | B2 | | 3/2005 | Wong et al. |
| 7,106,465 | B1 | | 9/2006 | Simpson et al. |
| 7,130,786 | B2 | * | 10/2006 | Grebenev ........................ 703/22 |

(Continued)

OTHER PUBLICATIONS

Kerstin Buchacker, Framework for Testing the Fault-Tolerance of Systems Including OS and Network Aspects, 2001.*

(Continued)

*Primary Examiner* — Lechi Truong
(74) *Attorney, Agent, or Firm* — John Jardine; Dan Choi; Micky Minhas (57) ABSTRACT

Module interrogation techniques are described in which modules configured to rely upon one or more operating system features are interrogated to determine which features are used and by which modules. A module is loaded that is configured to interact with a plurality of features provided by an operating system. Using one or more redirection techniques, calls made by the module to access features of the operating system are redirected to alternate functionality. Based on the redirection, data is generated to indicate the features of the operating system that are used by the module. The techniques may be performed for each of a plurality of modules to populate a database that relates features of the operating system to the plurality of modules.

20 Claims, 4 Drawing Sheets (56) References Cited

U.S. PATENT DOCUMENTS

| | | | |
|---|---|---|---|
| 7,339,696 B2 | 3/2008 | Ferlitsch | |
| 7,689,926 B2 | 3/2010 | de Souza et al. | |
| 7,721,068 B2* | 5/2010 | Lowe et al. | 711/206 |
| 7,721,272 B2* | 5/2010 | Mockford | G06F 8/71 717/120 |
| 8,117,625 B2 | 2/2012 | Needamangala | |
| 8,407,699 B2* | 3/2013 | Larkin et al. | 718/1 |
| 2005/0149947 A1* | 7/2005 | Callender | 719/321 |
| 2007/0201070 A1 | 8/2007 | Tomizuka | |
| 2007/0240055 A1* | 10/2007 | Ting | G06F 9/4443 715/704 |
| 2009/0241131 A1 | 9/2009 | Needamangala | |

OTHER PUBLICATIONS

"Notice of Allowance", U.S. Appl. No. 12/051,823, (Oct. 6, 2011), 14 pages.

"XPS Conversion Path Application Test Suites", Retrieved from http://www.qualitylogic.com/xps/xps_test_tools/xps_conversion_ats.html on Jun. 25, 2008., 2 Pages.

"XPSDrv Configuration Module Implementation", Retrieved from http://download.microsoft.com/download/9/c/5/9c5b2167-8017-4bae-9fde-d599bac8184a/XPSDrv_Config.doc., 13 Pages.

Ball, Thomas et al., "Thorough Static Analysis of Device Drivers", *Microsoft Corporation*, Retrieved from: <http://www.cs.kuleuven.be/conference/EuroSys2006/papers/p73-ball.pdf>,(Apr. 2006), 14 Pages.

Feng, Xin et al., "Integrating Embedded PC and Internet Technologies for Real-Time Control and Imaging", IEEE/ASME Transactions on Mechatronics, vol. 7, No. 1, (Mar. 2002), 9 pages.

Terry, Donn et al., "Static Analysis and Verification of Drivers", Retrieved from http://download.microsoft.com/download/5/b/9/5b97017b-e28a-4bae-ba48-174cf47d23cd/DEV083_WH06.ppt., 11 Pages.

* cited by examiner

MODULE INTERROGATION

RELATED APPLICATIONS

This application is a continuation of and claims priority under 35 U.S.C. §120 to U.S. patent application Ser. No. 12/051,823, filed on Mar. 19, 2008, now U.S. Pat. No. 8,117,625 and titled "Module Interrogation," the disclosure of which is incorporated by reference in its entirety herein.

BACKGROUND

An operating system may provide a variety of features (e.g., tools, functions, interfaces, services, and so forth) which modules (e.g., application modules, plug-ins, drivers, extensibility modules, and so on) developed by third-party developers may utilize to take advantage of the operating system. Thus, when a developer makes changes to a feature of the operating system, the changes may affect various third-party modules that have been developed to utilize the feature. For example, when changes are made to one or more features of a print subsystem, the changes may affect a plurality of printer drivers that rely upon the one or more features. However, the developer may not know exactly which printer drivers use the one or more features. Due to the number of different third-party printer drivers that may be supported by the operating system, it may difficult to determine which features are relied upon by each printer driver.

One traditional technique used to determine features of an operating involves individually running and testing each module. In the case of printer drivers, a test print job may be sent to each printer driver to capture calls that are made from the drivers to features available from the operating system. However, testing a large number of printer drivers with a test print job may take considerable time. Further, it may be difficult to arrive at a suitable test print job that causes each printer driver to trigger the set of operating system features with which the developer is concerned. Another traditional technique limits test testing to a sampling of the available printer drivers (e.g., top 5% or 10%). However, this technique does not provide complete information regarding which printer drivers use which features of the operating system. Accordingly, traditional techniques may be complex, time-consuming, and/or provide incomplete results.

SUMMARY

Module interrogation techniques are described in which modules configured to rely upon one or more operating system features are interrogated to determine which features of the operating system are used and by which modules. A module is loaded that is configured to interact with a plurality of features provided by an operating system. Using one or more redirection techniques, calls made by the module to access features of the operating system are redirected to alternate functionality. Based on the redirection, data is generated to indicate the features of the operating system that are used by the module. The techniques may be performed for each of a plurality of modules to populate a database that relates features of the operating system to the plurality of modules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

When a developer updates, removes, or otherwise changes features (e.g., tools, functions, interfaces, services, and so on) provided by an operating system, the changes may affect a variety of third-party modules (e.g., applications, plug-ins, extensions, drivers, and so on) that may rely upon the changed features. Accordingly, the developer may be interested in knowing which third-party modules rely upon the various features that are being updated. However, a wide range of optional features may be provided, only some of which may be employed by each particular module. Thus, it becomes difficult for the developer to determine the dependencies that exist between for multiple modules and the operating system, e.g., which features are being used and by which modules.

Accordingly, module interrogation techniques are described in which dependencies of modules to features of an operating system are determined. In an implementation, an interrogation tool may statically manipulate one or more modules to determine the dependencies of the modules on operating system features. In an implementation, a plurality of printer drivers may be specified by a developer to determine which printing features of an operating system are used by the printer drivers. Printing features may include features provided by a printing subsystem as well as those of a graphics subsystem. A variety of other examples of operating system functionality and features that may be interrogated are also contemplated.

In an implementation, various redirection techniques may be employed to redirect calls made by a module to the interrogation tool or other alternative functionality configured to log the calls. One redirection technique involves overwriting an import address table (IAT) of the module being manipulated to redirect calls that are made to the operating system. Another redirection technique involves overwriting an export address table (EAT) of an operating system dynamic link library (DLL) to redirect calls that are made to functions exported by the DLL. A variety of other redirection techniques are also contemplated. Based on the redirection, the interrogation tool may generate a log for each module that indicates dependencies of the module upon operating system features. The interrogation tool may output the logs files to populate a database that relates a plurality of module to available features of the operating system.

In the following discussion, an exemplary environment is first described that is operable to perform module interrogation techniques. Exemplary procedures are then described that may be employed in the exemplary environment, as well as in other environments. Although these techniques are described as employed within an exemplary computing environment in the following discussion, it should be readily apparent that these techniques may be incorporated within a variety of environments without departing from the spirit and scope thereof.

Exemplary Environment

Figure 1:
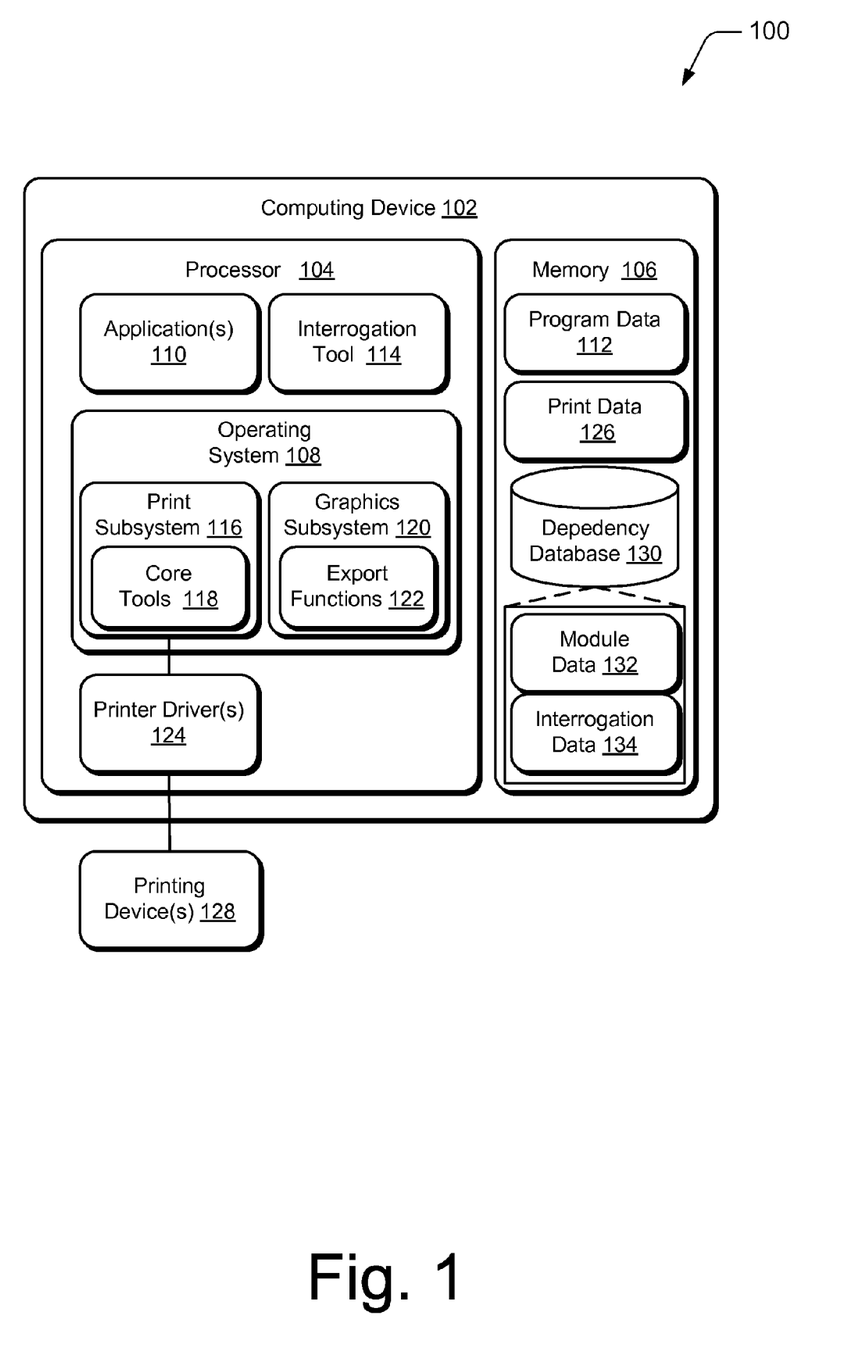
FIG. 1 depicts an exemplary environment in which module interrogation techniques may be employed.

FIG. 1 is an illustration of an environment 100 in an exemplary implementation that is operable to employ module interrogation techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, an entertainment appliance, a set-top box communicatively coupled to a display device, a wireless phone, a game console, and so forth.

In the following description a referenced component, such as computing device 102, may refer to one or more entities. Therefore, by convention, reference may be made to a single entity (e.g., the computing device 102) or multiple entities (e.g., the computing devices 102, the plurality of computing devices 102, and so on) using the same reference number.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 106 is shown for the computing device 102, a wide variety of types and combinations of memory may be employed, such as computer-readable storage media examples of which include random access memory (RAM), hard disk memory, video memory, removable medium memory, and other types of computer-readable media.

The one or more processors 104 are illustrated as executing an operating system 108 which is also storable in the memory 106. Memory 106 also includes a variety of applications 110 and related program data 112. The one or more processors 104 may retrieve and execute computer-program instructions from applications 110 to provide a wide range of functionality to the computing device 102, including but not limited to office productivity, email, media management, printing, networking, web-browsing, and so forth. A variety of program data 112 is contemplated examples of which include office documents, multimedia files, emails, data files, web pages, user profile and/or preference data, and so forth.

Processor 104, in addition to executing the operating system 108, is further illustrated as executing an interrogation tool 114 which may also be stored in the memory 106. While depicted as a stand-alone module in FIG. 1, the interrogation tool 114 may also be implemented as a sub-module of another application 110. Interrogation tool 114 is representative of functionality of the computing device 102 that is operable to perform module interrogation techniques described herein. In particular, the interrogation tool 114 may operate to determine dependencies of a variety of modules to various features (e.g., tools, functions, interfaces, services, and so on) that are provided through the operating system 108.

The interrogation tool 114 may manipulate a plurality of modules to intercept calls made by the modules to the operating system 108. For instance, various redirection techniques may be employed to redirect calls made by a module to the interrogation tool 114 and/or an alternative implementation of the functionality being called so that the interrogation tool 114 may log or otherwise track the calls. One redirection technique involves overwriting an import address table (IAT) of the module being manipulated to redirect calls that are made to the operating system 108. Another redirection technique involves overwriting an export address table (EAT) of a dynamic link library (DLL) of the operating system 108 to redirect calls that are made to functions exported by the DLL. A variety of other redirection techniques are also contemplated. Based on the redirection, the interrogation tool 114 may generate a log for each module that describes dependencies of the module upon features of the operating system 108.

In example environment 100 of FIG. 1, the computing device 102 is illustrated as configured to perform module interrogation techniques in relation to various printing functionality which may be provided through the computing device 102 and in particular the operating system 108. While certain aspects are described herein in relation to printers and print functionality, those of skill in the art will appreciate that the described techniques for module interrogation are applicable in a variety of contexts and with a wide range of operating system functionality and corresponding modules. The described printing functionality, printers, and printer drivers are but one example of the various functionality, peripheral devices, and corresponding drivers that are contemplated.

By way of example, operating system 108 is illustrated as including a print subsystem 116 which may be configured to provide a variety of core tools 118 related to printing functionality of the computing device 102. Operating system 108 may also include a graphic subsystem 120 which may implement a variety of export functions 122 callable to perform a variety of graphics processing functions. The export functions 122 may be arranged as one or more dynamic link libraries (DLLs) of the operating system 108.

The graphics subsystem 120 may be configured to render various graphical objects for printing as well as for other tasks. For instance, the graphics subsystem 120 and in particular the export functions 122 may be callable to perform drawing of lines and curves, font rendering, shading, and other graphics operations. Thus, graphics subsystem is representative of a variety of functionality to facilitate output of graphic data to output devices, such as to a monitor, a printer, or other peripheral devices. The print subsystem 116 and graphics subsystem 120 may each be configured to provide one or more respective application programming interfaces (APIs) that are callable by third-party modules to provide printing functionality and graphics rendering functionality respectively.

One or more printer drivers 124 may be executed on the processor 104 to facilitate output of print data 126 via corresponding printing devices 128. The operating system 108 may support a variety of print drivers 124. Thus, a variety of printer drivers 124 may be stored in the memory 106 and executed on the processor 104 to enable computing device 102 to interact with a variety of corresponding printing devices 128. As noted, the printer drivers 124 facilitate output of print data 126 that may be produced by the computing device 102, such as through operation of the applications 110.

Generally, the printer drivers 124 represent third-party modules that provide interfaces between the applications 110 and the printing functionality of the operating system 108, as well as interfaces between the operating system 108 and corresponding printing devices 128. The print subsystem 116 may include various printing application programming interfaces (APIs), system drivers, functions, and other core tools 118. A particular one of the printer drivers 124 may represent a driver developed by a third-party (e.g., a printer manufacturer) for a corresponding one of the printing devices 128. Further, each printer driver 124 may use different operating system features and correspond to a different printer 128.

In operation, an application 110 may generate print data 126, which is illustrated as stored in memory 106. For instance, in a word processing program a user may create a formatted text document and then select a print command to cause output of the document on a printing device 128. When a print command of an application 110 is selected, the application 110 may output print data 126 and interact with the print subsystem 116 to access printing functionality available through the operating system 108 and to create a print job. The operating system 108 and print subsystem 116 may process and format the print job for output to a printing device 128 communicatively connected to a computing device 102. A printer driver 124 facilitates communication between the computing device 102 and a corresponding printing device 128 and may operate to format print data 126 related to the print job in a language and/or format understandable by the printing device 128.

A printer driver 124 may be configured to use various core tools 118 provided via the print subsystem 116 to output the print data 126 via the printing device 128. Printer driver 124 may also be configured to use various export functions 122 available from the graphics subsystem 120. Thus, each of the print drivers 124 may have dependencies to a variety of operating system 108 features, including both the core tools 118 of the print subsystem 116 and the export functions 122 of the graphics subsystem 120. In an implementation, the interrogation tool 114 may be configured to interrogate the plurality of printer drivers 124 to determine the dependencies between the printer drivers 124 and features of the operating system 108.

Thus, the interrogation tool 114 is representative of functionality to manipulate various modules, such as the illustrated printer drivers 124, to determine dependencies, generate related data, and log the dependencies. The interrogation tool 114 may output the data generated through interrogation of a plurality of modules to populate a database that relates to available features of the operating system 108.

For instance, FIG. 1 depicts a dependency database 130 stored in memory 106 that may be generated through operation of the interrogation tool 114. The dependency database 130 is illustrated as including module data 132 and interrogation data 134. The module data 132 may describe various modules to be interrogated. For instance, module data 132 may designate a set of printer drivers 124 to be interrogated for dependencies on printing features of the operating system 108. Based on the module data 132, interrogation tool 114 may interrogate the designated printer drivers 124 and/or other designated modules. Interrogation data 134 is representative of results of interrogation performed by the interrogation tool 114. For example, interrogation data 134 may be configured as a plurality of logs corresponding to each interrogated module, or other data sufficient to indicate the dependencies of modules upon features of the operating system 108. Further discussion of module interrogation techniques that may be performed by interrogation tool 114 may be found in relation to the following procedures.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide module interrogation are platform independent, meaning that the techniques may be implemented on a variety of commercial computing platforms having a variety of processors.

Exemplary Procedures

The following discussion describes techniques related to module interrogation that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the exemplary environment 100 of FIG. 1.

Figure 2:
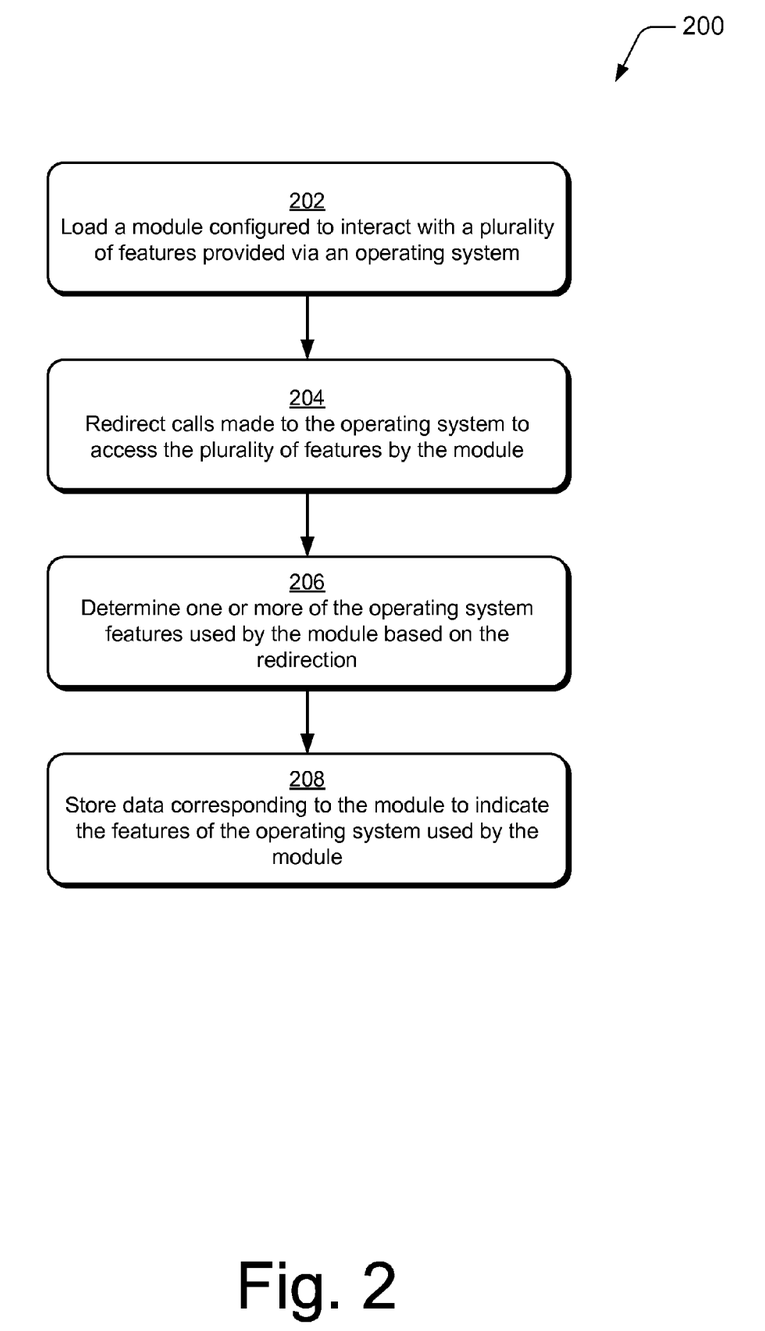
FIG. 2 depicts an exemplary procedure in which features of an operating system used by a module are determined.

FIG. 2 depicts a procedure 200 in an exemplary implementation in which features of an operating system that are used by a module are determined. A module is loaded that is configured to interact with a plurality of features provided via an operating system (block 202). For example, the interrogation tool 114 of FIG. 1 may load an application 110 that may be configured to perform processing related to output of graphic data. For the purposes of example assume the application 110 performs tasks related to display of a user interface on an LCD monitor communicatively coupled the computing device 102. In order to output the graphics data of the user interface, the application 110 may be configured to interact with a variety of features provided via the operating system 108. For example, the application 110 may call one or more export functions 122 provided via the graphics subsystem 120 of FIG. 1. A variety of other examples are also contemplated.

Calls are redirected that are made to the operating system to access the plurality of features by the module (block 204). For instance, interrogation tool 114 may redirect calls made by application 110 to the graphics subsystem 120 using a variety of redirection techniques. In general, the interrogation tool 114 may operate to redirect calls that are made to operating system functionality to substitute functionality provided via the interrogation tool 114. Examples of redirection techniques that may be employed include but are not limited to: function overwriting, address table modification, code replacement, static redirection, and so forth. The substitute functionality that is provided through the redirection permits determining for each module analyzed corresponding features of the operating system 108 that are used by the module. Additional discussion of redirection techniques that may be employed by interrogation tool 114 may be found in relation to the following figures.

Based on the redirection, one or more of the operating system features are determined that are used by the module (block 206). Continuing the preceding example, the interrogation tool 114 may determine one or more features that are used by the application 110. For instance, assume the application 110 calls a "curve_render" function included with export functions 122. The call may be redirected via the interrogation tool 114 to an alternate function configured to log or otherwise track the call. In this manner, the interrogation tool 114 intercepts the original call made to the operating system 108. The alternate function to which the call is redirected may then duplicate the functionality provided by "curve_render" function and/or callback to the "curve_render" function. The interrogation tool 114 may be configured to perform a variety of such function redirections to track interaction of the application 110 with a suite of features that are provided via the operating system 108. Typically a module, such as the application 110 in this example, may use a subset of the available features provided by the operating system 108. Using the module interrogation techniques described herein, a subset of available features used by a particular module may be identified.

Then, data is stored that corresponds to the module that indicates the features of the operating system which are used by the module (block 208). For example, the interrogation tool 114 may generate a log file for each interrogated module. The log files indicate for a corresponding module the features of the operating system 108 identified as being used by a module. The log files may be used to populate a database that relates modules to available features of the operating system 108. For instance, the dependency database 130 of FIG. 1 may store interrogation data 134 corresponding to a variety of modules which are interrogated by the interrogation tool 114, such as applications 110, printer drivers 124, other device drivers, and so forth. A developer may reference the dependency database 130 to understand the dependencies of various modules to features of the operating system 108.

Figure 3:
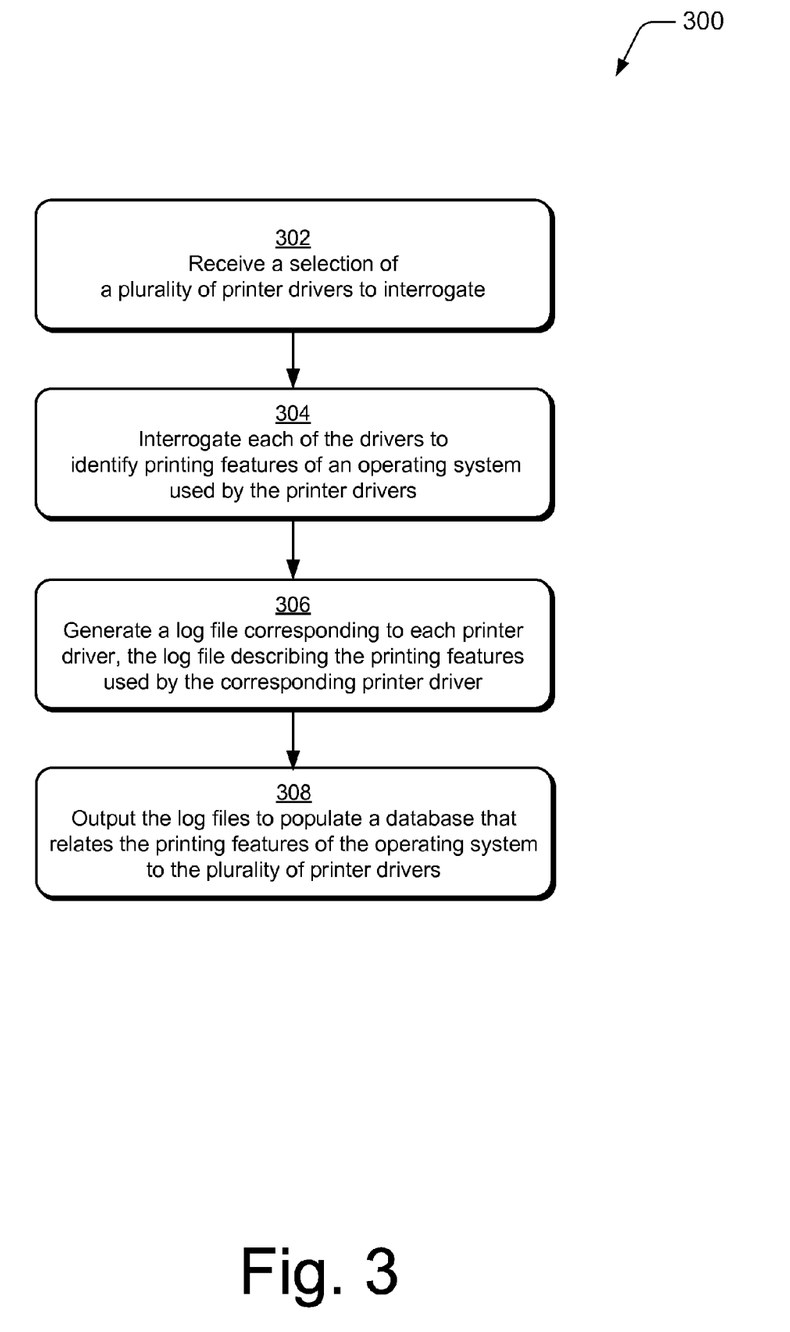
FIG. 3 depicts an exemplary procedure in which a plurality of printer drivers is interrogated to determine features of the operating system used by the printer drivers.

FIG. 3 depicts a procedure 300 in an exemplary implementation 300 in which a plurality of printer drivers are interrogated to identify printing features of an operating system used by the drivers. A selection of a plurality of printer drivers to interrogate is received (block 302). For example, a developer may input or select a list of printer drivers 124 to interrogate via the interrogation tool 114. The interrogation tool 114 receives the list of printer drivers 124. A list of printer drivers 124 and/or other modules which are to be interrogated may be maintained in storage, for example as module data 132 in dependency database 130. Further, a developer may define different groups of modules to interrogate, set a frequency corresponding to how often to interrogate each group, and/or designate features to be tested with each group. The interrogation tool 114 may reference module data 132 to automatically perform interrogation of modules for designated features at the specified frequencies. For instance, module data 132 may include a group of printer drivers 124 to be tested every two weeks to determine dependencies to both print subsystem 116 and graphics subsystem 120 of the operating system 108. Another group may be specified to test graphics drivers against the graphics subsystem 120 every month. A variety of other groups, interrogation frequencies, subsets of operating system functionality, and so forth are also contemplated.

Each of the printer drivers is interrogated to identify printing features of an operating system used by the printer drivers (block 304). For instance, a plurality of printer drivers 124 as in FIG. 1 may be interrogated by interrogation tool 114 to determine dependencies to printing features provided via the operating system 108. More particularly, printer drivers 124 may be interrogated to determine dependencies to core tools 118 provided by a print subsystem 116 and to export functions 122 provided by the graphics subsystem 120.

In general, interrogation tool 114 behaves as if it were the operating system 108 to interrogate the printer drivers 124. In an implementation, the interrogation tool 114 may initiate communication with a printer driver 124 being interrogated. The interrogation tool 114 may be configured to manipulate entry points to the printer driver 124, such that the printer driver 124 believes it is interacting with the operating system 108. To establish communication, the printer driver 124 may negotiate communication protocols with the interrogation tool 114. As part of this negotiation, a printer driver 124 may provide a list of features of the operating system 108 that the printer driver 124 is configured to use. For instance, the printer driver 124 may provide a list of functions to populate an import address table that the printer driver 124 uses to import various functions from one or more DLLs of the operating system 108. In this example, the interrogation tool 114, acting as the operating system 108, intercepts the list that is provided by the printer driver 124. Thus, the interrogation tool 114 may identify directly from a printer driver 124 at least some of the features of the operating system 108 used by the printer driver 124.

In an implementation, the interrogation tool 114 may use a list of functions identified by a printer driver 124 to determine additional interrogations to perform. For instance, interrogation tool 114 may use one or more redirection techniques to redirect calls made by the printer driver 124 to the identified functions such that the calls are redirected to the interrogation tool 114 and/or an alternate implementation of the function provided by the interrogation tool 114. The interrogation tool 114 may then manipulate the printer driver 124 to cause one or more calls to the identified functions. Based on the redirection, interrogation tool 114 may intercept the one or more calls to identify features of the operating system 108 that are used by the printer driver 124. Further discussion of interrogation and redirection techniques that may be employed by interrogation tool 114 may be found in relation to the following figure.

A log file corresponding to each printer driver is generated, the log file describing the printing features used by the corresponding printer driver (block 306). Based on the interrogation of the plurality of printer drivers 124, a log file may be generated which describes the list of functions identified by the printer driver 124. In addition, the log file may include additional information regarding features of the operating system used by the printer drivers 124 that is determined through manipulation of printer drivers 124 by the interrogation tool 114.

The log files are output to populate a database that relates the printing features of the operating system to the plurality of printer drivers (block 308). Log files generated through interrogation of the printer drivers 124 may be stored in memory 106 of the computing device 102. In particular, log files and/or other types of interrogation data 134 generated via the interrogation tool 114 may be stored in a dependency database 130 as shown in FIG. 1. A dependency database 130 may be maintained to relate modules, including the printer drivers 124, to features of the operating system 108.

When a database such as dependency database 130 has been populated with interrogation data 134, the dependency database 130 may be exposed via the web. This exposure may enable a developer to search the database, query the database, reference drivers or other modules, search for particular features of the operating system 108, and so forth. In particular, a web-based user interface may be exposed to enable a variety of user interactions with the dependency database 130. In this manner, a developer may determine which modules are likely to be affected by changes made to a particular feature of the operating system 108. This may permit the developer to quickly identify modules that use a particular feature which the developer intends to alter, update, remove, or otherwise change. Accordingly, the developer is able to focus attention and resources on the identified modules.

In an implementation, the log files and/or other interrogation data 134 may be configured as extensible markup language (XML) files. Each XML file may include data to identify a corresponding driver, indicate features used by the driver, the date of interrogation, and so forth. While the dependency database 130 is depicted in memory 106 that is local to the computing device 102, it is noted that interrogation data 134 generated via the interrogation tool 114 may also be used to populate a dependency database 130 maintained at a remote storage location. The dependency database 130 may be made accessible to plurality of computing devices 102 and users over a network. For instance, XML files representing interrogation data 134 for a plurality of printer drivers 124 may be communicated over a network to a remote storage location. The XML files may be retrieved from local or remote storage to populate a dependency database 130. In an implementation, a parser tool may operate on the XML files to populate the dependency database 130 maintained locally or remotely.

As noted previously, interrogation tool 114 may be configured to automatically perform interrogation of a plurality of modules on a periodic basis. For example, the interrogation tool 114 may periodically cycle through a designated group of printer drivers 124 to determine corresponding dependencies to features of the operating system 108. The results of a periodic interrogation may be stored locally or remotely as interrogation data 134. A parser tool may process these results to populate the dependency database 130. In this manner, the dependency database 130 may be periodically updated through the interrogation tool 114 and/or a parser tool automatically and without user intervention.

Figure 4:
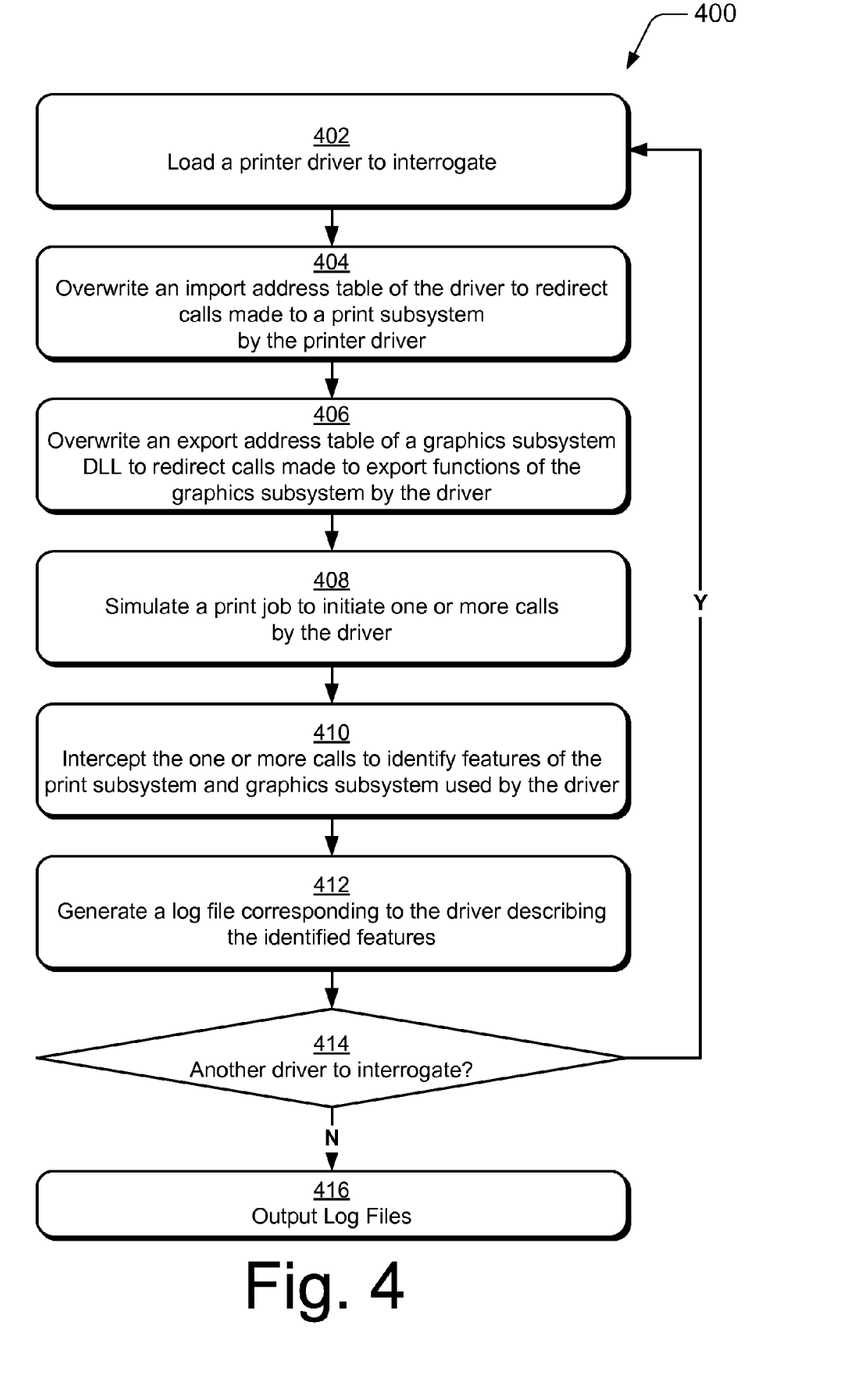
FIG. 4 depicts an exemplary procedure in which calls made by a printer driver to a print subsystem and a graphics subsystem are redirected to determine features of the print subsystem and the graphics subsystem used by the printer driver.

FIG. 4 depicts a procedure 400 in an exemplary implementation in which calls made by one or more drivers to a print subsystem and a graphics subsystem are redirected to determine features of the print subsystem and a graphics subsystem used by the one or more drivers. A driver is loaded to interrogate (402). For example, a printer driver 124 may be loaded via the interrogation tool 114 of FIG. 1. To output print data 126 via a corresponding printing device 128, the printer driver 124 may be configured to interact with core tools 118 of the print subsystem 116 and/or export functions 122 of a graphics subsystem 120. As noted previously, the interrogation tool 114 may reference module data 132 to determine one or more printer drivers 124 to interrogate, as well as how often to perform the interrogation.

An import address table of the driver is overwritten to redirect calls made to a print subsystem by the driver (block 404). For example, the printer driver 124 may be configured to call an "open_printer" function which is part of the core tools 118. To use the "open_printer" function, the printer driver 124 may include a pointer to the "open_printer" function in an import address table. When the printer driver 124 is loaded, the interrogation tool 114 may operate to overwrite the pointer to "open_printer" in the import address table with a pointer to an alternate implementation of the function that is provided by the interrogation tool 114. Thus, calls made to the "open_printer" function are redirected to the interrogation tool 114 which may then log or otherwise track the calls. Of course many redirections may be made to various functions (e.g., core tools 118) of the print subsystem 116 that may be called by the printer driver 124 using an import address table.

An export address table of a graphics subsystem dynamic link library (DLL) is overwritten to redirect calls made to export functions all of the graphics subsystem by the driver (block 406). For example, to output a print job the printer driver 124 may be configured to use one or more export functions 122 provided by the graphics subsystem 120. For the purposes of example, assume that the printer driver 124 calls a "draw_line" function provided by the graphics subsystem 120. The export functions 122, including the "draw_line" function, may be provided via one or more dynamic link libraries (DLL) of the graphics subsystem 120. The DLLs may include an export address table that provides pointers, addresses, and/or other suitable location data to identify the location of the export functions 122. Thus, a module importing functions from the DLL may reference the export address table to determine a location of the functions.

The interrogation tool 114 may operate to load a DLL that contains the "draw_line" function and overwrite a pointer to the "draw_line" function in the export address table with a pointer to an alternate implementation of "draw_line" function that is provided by the interrogation tool 114. Thus, calls made to the "draw_line" function are redirected to the interrogation tool 114 which may log or otherwise track the calls. Of course many redirections may be made to various functions (e.g., export functions 122) of the graphics subsystem 120 that may be imported by the printer driver 124 using the export address table of one or more DLLs.

A print job is simulated to initiate one or more calls by the driver (block 408). Based on the redirections in the preceding examples, the interrogation tool 114 may capture calls made by the printer driver 124 to both the print subsystem 116 and the graphics subsystem 120. The interrogation tool 114 may be configured to manipulate the printer driver 124 to cause various calls to be made to the operating system 108. For instance, the interrogation tool 114 may simulate a print job. The print job is simulated in the sense that content may not actually be printed through the printer driver 124 and the interrogation may not be dependent upon actual print data 126. Rather, the interrogation tool 114 statically manipulates various entry points of the printer driver 124 to cause the printer driver 124 to behave as if it was receiving and processing a print job. The interrogation tool 114 communicates with the printer driver 124 as though it was the operating system 108 and may trigger a defined set of entry points for each printer driver 124 that it interrogates. For example, the interrogation tool 114 may initiate communication and intercept a list of functions identified by the printer driver 124 as described in relation to FIG. 3.

In addition, the interrogation tool 114 may simulate processing of various types of data to trigger corresponding responses (e.g., calls to various features of the operating system 108) from the printer driver 124. For instance, the interrogation tool 114 may statically call the print driver 124 with individual triggers to simulate text processing, bit blips, graphics primitives, and so on. The interrogation tool 114 may be configured to provide the same set of individual triggers to each printer driver 124 interrogated.

The one or more calls are intercepted to identify features of the print subsystem and graphics subsystem used by the driver (block 410). In the preceding example, the calls that are made by a printer driver 124 responsive to the simulated print job are intercepted based upon the previously described redirections. The calls are redirected through the interrogation tool 114 which processes the calls and provides responses to the printer driver 124. Based on the intercepted calls, the interrogation tool 114 identifies the features of the print subsystem 116 and graphics subsystem 120 that are used by the printer driver 124 responsive to the simulated print job.

A log file corresponding to the driver is generated to describe the identify features (block 412). Continuing the above example, interrogation tool 114 generates interrogation data 134 corresponding to the printer driver 124 that describes the features of the print subsystem 116 and graphics subsystem 120 that the printer driver 124 used responsive to the simulated print job. The interrogation data 134 may be configured as a log file which may be stored in the memory 106 of the computing device 102.

A determination is made whether another driver is to be interrogated (block 414). When there is another driver to interrogate, the procedure 400 returns to repeat blocks 402-412 for the next driver. In this manner, the interrogation tool 114 may be configured to cycle through a plurality of printer drivers 124 and identify features of the operating system 108 used by each of the plurality of printer drivers 124. Further, the interrogation tool may be configured to interrogate a defined set of printer drivers 124 periodically such that interrogation data 134 is frequently updated. The interrogation tool 114 may be configured to perform periodic interrogation automatically and without user intervention.

When there is not another driver to interrogate, the log files generated for each driver are output (block 416). For instance, log files generated through operation of the interrogation tool 114 that correspond to one or more printer drivers 124 may be used to populate a dependency database 130 as previously described.

CONCLUSION

Although the module interrogation techniques have been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method comprising:
identifying a module to test from a list of modules in a database, the database being configured to relate a plurality of features of an operating system to a plurality of modules configured to interact with the plurality of features and the database being exposed in a web-based user interface to enable the database to be searched for the plurality of features of the operating system;
loading the identified module so it is configured to interact with the operating system having the plurality of features;
redirecting calls made by the module to the operating system;
based at least in part on said redirecting, tracking an interaction of the module with the operating system including determining different features of the operating system used by the calls made by the module, the different features including different tools, interfaces, and services provided by the operating system;
generating a log for the module, including indicating multiple different features of the operating system used by the calls made by the module; and
populating the database with data from the log.

2. The computer-implemented method as recited in claim 1, wherein the redirecting includes overwriting an import address table of the module to redirect calls made by the module to the operating system.

3. The computer-implemented method as recited in claim 1, wherein the redirecting includes overwriting an export address table of a dynamic link library (DLL) provided by the operating system to redirect calls made by the module to exported functions of the DLL.

4. The computer-implemented method as recited in claim 1, wherein the redirecting includes:
overwriting an import address table of the module to redirect calls made by the module to the operating system; and
overwriting an export address table of a dynamic link library (DLL) provided by the operating system to redirect calls made by the module to exported functions of the DLL.

5. The computer-implemented method as recited in claim 1, wherein the module is configured as a device driver to facilitate communication between the operating system and a corresponding peripheral device.

6. The computer-implemented method as recited in claim 1, wherein the module is configured as printer driver to facilitate communication between the operating system and a corresponding printing device.

7. The computer-implemented method as recited in claim 1, wherein the plurality of features of the operating system include a print subsystem implementing one or more application programming interfaces (APIs) to provide printing functionality.

8. The computer-implemented method as recited in claim 1, wherein the plurality of features of the operating system include a graphics subsystem implementing one or more application programming interfaces (APIs) to provide graphics rendering functionality.

9. The computer-implemented method as recited in claim 1, wherein the determining further comprises:
initiating communication with the module; and
receiving from the module a list identifying one or more of said features of the operating system used by the module.

10. The computer-implemented method as recited in claim 1, further comprising repeating the identifying, the loading, the redirecting, the tracking, the generating, and the populating for an additional module from the list of modules and updating the database.

11. A computing device comprising:
a memory device storing;
an operating system;
a plurality of device drivers supported by the operating system; and
a module interrogation tool operable to perform operations including:
identifying a device driver to test from a list of the plurality of device drivers in a database, the database being configured to relate a plurality of features of the operating system to the plurality of device drivers configured to interact with the plurality of features and the database being exposed in a web-based user interface to enable the database to be searched for the plurality of features of the operating system;

loading the identified device driver so it is configured to interact with the plurality of features of the operating system;

redirecting calls made by the device driver to the operating system;

based at least in part on said redirecting, tracking an interaction of the module with the operating system including determining different features of the operating system used by the calls made by the device driver, the different features including different tools, interfaces, and services provided by the operating system;

generating a log for the device driver, including indicating dependencies of the device driver to the different tools, interfaces, and services provided by the operating system; and populating the database with data from the log including the indicated dependencies.

12. The computing device as recited in claim 11, wherein the redirecting includes overwriting an import address table of the device driver to redirect calls made by the device driver to the operating system.

13. The computing device as recited in claim 11, wherein the redirecting includes overwriting an export address table of a dynamic link library (DLL) provided by the operating system to redirect calls made by the device driver to exported functions of the DLL.

14. The computing device as recited in claim 11, wherein the device driver is configured to facilitate communication between the operating system and a corresponding peripheral device.

15. The computing device as recited in claim 11, wherein the determining further comprises:
   initiating communication with the device driver; and
   receiving from the device driver a list identifying one or more of said features of the operating system used by the device driver.

16. One or more computer-readable storage memories comprising instructions thereon that, responsive to execution by a computing device, cause the computing device to implement a module interrogation tool operable to perform operations including:

identifying a device driver to test from a list of a plurality of device drivers in a database, the database being configured to relate a plurality of features of the operating system to the plurality of device drivers configured to interact with the plurality of features and the database being exposed in a web-based user interface to enable the database to be searched for the plurality of features of the operating system;

loading the identified device driver so it is configured to use the plurality of features of the operating system;

redirecting calls made by the device driver to the operating system;

based at least in part on said redirecting, tracking an interaction of the module with the operating system including determining different features of the operating system used by the calls made by the device driver, the different features including different tools, interfaces, and services provided by the operating system;

generating a log for the device driver, including indicating different tools, interfaces, and services used by the calls made by the device driver; and populating the database with data from the log.

17. One or more computer-readable storage memories as recited in claim 16, wherein the redirecting includes overwriting an import address table of the device driver to redirect calls made by the device driver to the operating system.

18. One or more computer-readable storage memories as recited in claim 16, wherein the redirecting includes overwriting an export address table of a dynamic link library (DLL) provided by the operating system to redirect calls made by the device driver to exported functions of the DLL.

19. One or more computer-readable storage memories as recited in claim 16, wherein the device driver is configured to facilitate communication between the operating system and a corresponding peripheral device.

20. One or more computer-readable storage memories as recited in claim 16, wherein the determining further comprises:
   initiating communication with the device driver; and
   receiving from the device driver a list identifying one or more of said features of the operating system used by the device driver.

* * * * *